Oct. 9, 1962  J. H. FORKNER  3,057,737
CACTUS METHOD AND PRODUCT
Filed Feb. 18, 1960
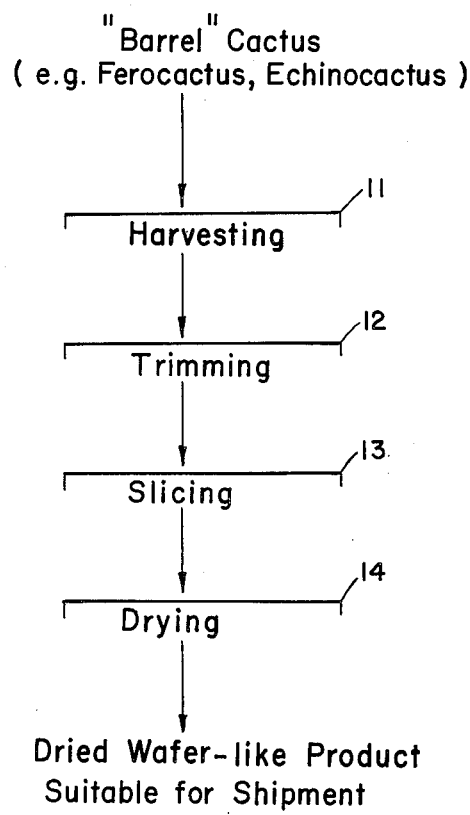
INVENTOR.
JOHN H. FORKNER
BY
Flehr & Swain
ATTORNEYS United States Patent Office 3,057,737
Patented Oct. 9, 1962

3,057,737
CACTUS METHOD AND PRODUCT
John H. Forkner, Fresno, Calif., assignor to The Pillsbury Company, Minneapolis, Minn., a corporation of Delaware
Filed Feb. 18, 1960, Ser. No. 9,564
6 Claims. (Cl. 99—204)

This invention relates generally to processes for the manufacture of valuable products from the fleshy interior of cactus plants, and particularly to such products in dehydrated form and useful as a transportable, easily handled base for the compounding of various foods or ingredients of foods.

The family Cactaceae, or cacti, is native to the Americas only, and was unknown prior to the discovery of America by Columbus. Since the plant is found principally in desert and semi-arid regions, it is understandable that for centuries man has paid it but little attention. Some attempts have been made to use the various fruits and pulp as food, but only the present conversion of the fruit into cactus candy is of any commercial importance. This candying process usually involves the cutting of the inner pulp into pieces, boiling the freshly cut pieces in water or alkali solutions to remove the natural bitter flavor, and the additional steps common to confectioners of subjecting the pieces to progressively heavier concentrations of a sugar syrup in the candying process. The preparation of a palatable syrup, and even preserves and pickles, from the fresh pulp of various cacti is also reported.

Because of the limitations of working with the fresh material, and the limited usefulness of the products produced, cacti have remained largely a matter of interest only to botanists and other naturalists. I have found however that the interior fleshy portions of certain cacti can be processed in a manner hitherto unknown to convert the flesh into a product of unexpected value and acceptance by the food industry. In particular, I have found that the interior pulpy cellulose of the cactus, when dehydrated under certain critical conditions, provides a dry product having characteristics which render it particularly useful as a base material in compounding various foods. By way of illustration, the dried base material can be readily rehydrated during subsequent processing to almost its original moisture content; it has a desirable light color, and does not darken upon rehydration, boiling, or when frozen; it has a skin-forming characteristic that is especially useful in protecting the cactus material during initial harvesting and processing to the dried product; and possesses many additional characteristics of considerable importance as will appear.

In general, a principal object of the present invention is to provide a novel process for the manufacture of a dehydrated, wafer-like base product from the fleshy interior of certain cactus plants.

Another object of the invention is to provide a process of the above character involving a series of steps which can be carried out with relatively low capital investment per ton of material produced.

Another object of the invention is to provide a dehydrated base product derived from cactus which is transportable and capable of being easily handled for further processing into compounded products.

Another object of the invention is to provide a base product of such character having a tough resistant outer surface, so that it can be readily cleaned or washed, without substantial rehydration, and which will effectively resist any undesired absorption of color or flavor.

Additional objects and advantages of the invention will appear from the following description wherein a preferred embodiment of the invention is set forth in detail in conjunction with the flow sheet of the accompanying drawing.

The present invention is predicated upon the discovery that certain varieties of cactus, and specifically that broad group of cacti known as "barrel" cactus, can be harvested and processed in such a way that certain desired unique characteristics can be retained and preserved for use in the compounding of various food materials. The processing forming the subject matter of the invention involves a series of operations capable of being carried out in the harvesting area, and which tend to remove or prevent the formation of undesired flavors, and which induce the formation of a protective skin to retard the evaporation of moisture. These operations include harvesting and sizing operations to produce a properly sized wafer-like intermediate product, and a gradual drying of this wafer product preferably by exposure to the sun. The resulting dehydrated wafers are of such character that they can be readily handled and transported for use in subsequent processing where the dried product is particularly useful as a base for compounding various food products. The dried wafers can be further reduced to a fragment size that will readily hydrate and which is particularly adapted to the assimilation of various syrups, fruit concentrates, flavors and the like. This latter processing is fully described in my copending application Serial No. 9,565, filed February 18, 1960.

The term "cactus" as used herein is intended to include any of the large group of substantially globular or cylindrical, strongly ribbed, cactus commonly referred to as "barrel" cactus, for example, members of the tribe Cereeae including any of the genus Ferocactus or Echinocactus. These cacti occur naturally in a large area extending from Southwestern United States as far south as Brazil and Argentina, and are abundant in large areas of Mexico, Lower California, Chile, Peru, and many Pacific offshore contiguous islands. The Galapagos Islands, for example, have abundant growths. They are also plentiful in certain parts of Arizona, New Mexico, Texas, and others of the United States. The particular value of the indicated varieties of cacti, compared to other cacti, is that they have a concentrated interior of moist solid flesh which is almost pure cellulose; also they have an average weight which is frequently in excess of about 100 pounds. The abundance of their growth therefore provides a promising commercial source of supply.

In the flow sheet of the accompanying drawing, I have shown the harvesting of the "barrel" cactus in Step 11. One method of harvesting is to cut the roots and felt the cactus with an axe. A machete can be inserted into the core of the cactus to open it in half. This procedure is rapid and permits the cactus to be inspected for acceptance without further effort. The halves of selected cacti weigh from 50 to 100 parts. Some larger cactus can be divided into several sections with each section weighing 100 pounds or more. The halves are then trimmed in Step 12 to remove the spines and part of the skin. This is easily done with a machete and knife. Almost immediately natural mucilage present in the cactus causes a new skin to form on the exposed surfaces which upon continued exposure to the sun becomes quite firm within about an hour. This skin is strong enough to support the cut sections and to protect them during subsequent transit for further processing.

In the next operation, Step 13, the cactus material is subjected to slicing to achieve an optimum thickness for drying in the Step 14. Slicing can be accomplished by hand but is more effectively performed by means of a slicer such as a Hobart slicer or similar device. Slice thickness is very critical because of the rapid skin-forming tendencies of the cactus material. I have found, for example, that unless the cactus is dried quickly in thin slices, skin formation will retard dehydration and ultimately cause an undesired interior discoloration of the material. Best results are obtained with thin wafer-like slices ranging in thickness from about 1/16 inch up to about 5/8 inch (optimum 3/16 inch). Individual slices may have a dimension of about 2 to 5 inches, although this is not necessary to effective drying.

The drying operation 14 can be carried out in various ways. For example, forced air or vacuum type dryers may be employed. However, for most purposes, sun drying is to be preferred, principally because sun drying imparts certain desired characteristics to the dried material. Drying in the vicinity of the harvesting and slicing operations is also facilitated. Thus, in a properly situated drying yard, the trimmed, harvested cactus can be washed, cut into pieces for grading and sorting, sliced into thin wafers, inspected, and immediately dried in wafer form on metal trays. Under favorable conditions, such as normally exist in the harvesting areas, the wafers will totally dry in one day, or in about 8 to 12 hours. During this drying, the moisture content of the cactus material is reduced from a normal of about 90 to 95% to a final moisture content between about 4½ to 5%. If desired, the wafers can be partially sundried during the day and dried to a final moisture content at night, by means of artificially heated or forced draft air.

As noted, sun drying imparts a number of desirable characteristics to the dried wafers. Specifically it removes much of the undesired alkaline flavor normally present in the cactus. While the exact mechanism of such flavor removal is not clearly understood, it is believed to involve oxidation reactions capable of proceeding to completion during the prolonged sun drying. The cactus material also contains natural anti-oxidants which are not affected by sun drying, with the result that the sun bleaches and retains the natural white color of the cactus more readily than artificial dryers. These anti-oxidant properties are retained by the cactus material and are effective during subsequent processing in the production of various food materials.

The sun drying also forms a tough protective skin on the freshly cut surfaces which serves to protect the dried wafers from contamination or attritional breakdown during handling and transit to the point of final use. This skin is of such character that the wafers can be thoroughly cleaned or washed following such transportation, without substantial rehydration or loss of desired values. Moreover, under some conditions of processing this skin-forming tendency is retained by the cactus material, enabling certain food products to resist loss of moisture and thereby obtain increased shelf life.

The processing described above is subject to further variations. For example, it is sometimes desirable to treat the trimmed sections derived from Step 12 with de-bittering agents such as lye or baking soda contained in a dilute solution of water. The de-bittered sections can then be washed with fresh water prior to the slicing operation in Step 13. Likewise, artificial drying under vacuum conditions in the Step 14 is sometimes to be preferred, and particularly where it is contemplated that the dried cactus wafers are subsequently to be rehydrated with various fats and oils. It should be understood that the disclosures herein are intended to be illustrative and not in any way limiting.

The following is illustrative of a typical procedure for producing dehydrated cactus wafers in accordance with the invention:

"Barrel" cactus (Variety—Echinocactus, Wislizinii) weighing from 50 to 150 pounds each, were harvested and split into sections, and spines and outer skins trimmed from the fleshy interior. A new skin quickly formed to retard the hydration and to protect sections during transportation to the drying area. At the drying yard, the sections were washed with water and cut into pieces, and unwanted fragments sorted out by hand. The pieces were then fed into a mechanical Hobart slicer which produced thin sliced wafers of approximately ¼ of an inch in thickness and about 4 inches square. The sliced wafer-like pieces were charged onto a conveyor for inspection and then loaded into shallow, metal drying trays. The wafers were spread on the trays with a rake and turned every 3 hours during the drying period (from 7:00 a.m. to 7:00 p.m. to effect a 12 hours drying period). The dried wafers were collected in large open mesh bags at the end of the day, inspected and packaged for shipment. The dried wafers were found to range in thickness from about 1/32 to 3/8 inch. Seventy five tons of sound, fresh cactus material treated in this manner yielded about 30 tons, trimmed, for delivery to the drying area. After removal of cores and gradeout, about 20 tons remained for drying. Final drying produced about 1 ton of the dried wafer product.

From the above, it should be apparent that the present invention makes possible treatment of fresh cactus to produce a dehydrated cactus product in novel form. The treatment also makes possible the production of cactus wafers having a tough outer skin, which is substantially moisture resistant, and which renders the wafers readily transportable and adaptable to use in various ways, particularly as a base for compounding various food products. Specifically, the wafers can be processed in the manner described in my aforementioned copending application, Serial No. 9,565, to provide dried wafer-like fragments having an enhanced capacity to rehydrate and to assimilate various liquids. This desirable characteristic apparently stems from an internal sponge-like cellular composition of the cactus material resulting from the drying (Step 14) and which is exposed during the formation of the fragments. Such fragments have been found to be ideally suited for use as a base stabilizer or carrier for additional ingredients in a wide variety of processed foods. My new process therefore makes possible satisfactory commercial methods for the production of many valuable products from the pulp of cactus.

The product produced by my method is different from any use of fresh cactus made heretofore and provides a dehydrated product having characteristics which are essentially altered and improved in relation to fresh cactus, or fresh cactus products.

I claim:

1. In a process for the treatment of fresh cactus, the steps of slicing the interior of the cactus into thin wafers of a thickness between 1/16 to 5/8 inch adapted to uniform drying, and subjecting the wafers to drying by evaporation of moisture from the surface thereof to produce dry wafers having a tough protective skin on their outer surfaces.

2. In a process for the treatment of fresh cactus, the steps of harvesting the cactus, trimming the outer skin and spines from the fleshy interior of the cactus, cutting and slicing the interior into thin wafers of from 1/16 to 5/8 inch in thickness, and drying the wafers by evaporation of moisture from the surface thereof to a final moisture content of the order of 5% simultaneously with the formation of a tough protective skin on their outer surfaces, said skin acting to substantially stabilize the moisture content of said wafers, whereby a stable easily handled, readily transportable base product is produced.

3. A process as in claim 2 wherein drying is accomplished by exposing the wafers to the sun in the open atmosphere for a period of from 8 to 12 hours.

4. A process as in claim 2 wherein drying is accomplished in conjunction with vacuum processing.

5. In a process for the treatment of fresh cactus, trimming the outer skin and spines from the interior of freshly harvested cactus, slicing the remaining interior into thin wafers of from 1/16 to 5/8 inch in thickness, exposing the wafers to the sun's rays in the open atmosphere until the moisture content is reduced to about 4½ to 5%, and recurrently turning the wafers during such exposure, the final dried wafers having a tough protective exterior skin formed during such exposure.

6. As a new article of manufacture, a lightweight, easily handled, transportable cactus product comprising a thin dehydrated cactus wafer of from 1/32 to 3/8 inch in thickness, said wafer being derived from the sun drying of the thinly sliced interior of fresh cactus, said wafer being characterized by a tough moisture-resistant outer skin, a sponge-like cellular interior and a moisture content of the order of about 4½ to 5% by weight.

References Cited in the file of this patent

UNITED STATES PATENTS 2,522,276    Ketcham _____ Sept. 12, 1950

OTHER REFERENCES

Desrosier: "Technology of Food Preservation" (1959), pages 132, 135 and 138.